(12) United States Patent
Enright et al.

(10) Patent No.: US 9,668,140 B2
(45) Date of Patent: May 30, 2017

(54) DEVALUATION OF LOST AND STOLEN DEVICES

(71) Applicant: Cellco Partnership, Basking Ridge, NJ (US)

(72) Inventors: Marlene Kay Enright, Bedminster, NJ (US); Balaji L. Raghavachari, Bridgewater, NJ (US); David B. Murray, Fanwood, NJ (US); Erel Tal, Princeton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/143,097

(22) Filed: Dec. 30, 2013

(65) Prior Publication Data

US 2015/0189510 A1     Jul. 2, 2015

(51) Int. Cl.
| | |
|---|---|
| *H04W 12/12* | (2009.01) |
| *H04W 12/00* | (2009.01) |
| *H04W 12/02* | (2009.01) |
| *H04W 12/06* | (2009.01) |
| *H04W 12/08* | (2009.01) |

(52) U.S. Cl.
CPC ......... *H04W 12/12* (2013.01); *H04W 12/00* (2013.01); *H04W 12/02* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 6,111,054 A * | 8/2000 | Haubennestel | B01F 17/0042 252/363.5 |
| 2001/0009583 A1 * | 7/2001 | Murakami | 380/278 |
| 2004/0267944 A1 * | 12/2004 | Britt, Jr. | 709/229 |
| 2005/0020315 A1 * | 1/2005 | Robertson | 455/565 |
| 2007/0056043 A1 * | 3/2007 | Onyon | H04W 12/12 726/26 |
| 2007/0294529 A1 * | 12/2007 | Blair et al. | 713/160 |
| 2008/0238614 A1 * | 10/2008 | Delia | H04W 12/08 340/5.85 |
| 2009/0075630 A1 * | 3/2009 | Mclean | 455/411 |
| 2009/0303066 A1 * | 12/2009 | Lee et al. | 340/679 |
| 2011/0022838 A1 * | 1/2011 | Shaikh | H04W 12/06 713/156 |
| 2012/0202462 A1 * | 8/2012 | Sudhakar | H04W 12/12 455/411 |

(Continued)

*Primary Examiner* — Lester Kincaid
*Assistant Examiner* — Daniel G Bassett

(57) ABSTRACT

A method for devaluing a lost/stolen mobile device includes: receiving, by a server, a report that a mobile device is lost/stolen; suspending, by the server, a mobile identifier number associated with the mobile device, in response to the report; and transmitting, by the server, via a communication network, the suspended mobile identifier number for storage at another location. Suspending the mobile identifier number includes preventing the lost/stolen mobile device from accessing the communication network. The method includes storing the suspended mobile identifier number in an equipment identity registry database. The method further includes turning OFF Wi-Fi access, in the mobile device, in response to suspending the mobile identifier number by the server.

20 Claims, 8 Drawing Sheets

(56) References Cited

U.S. PATENT DOCUMENTS

Figure 1:
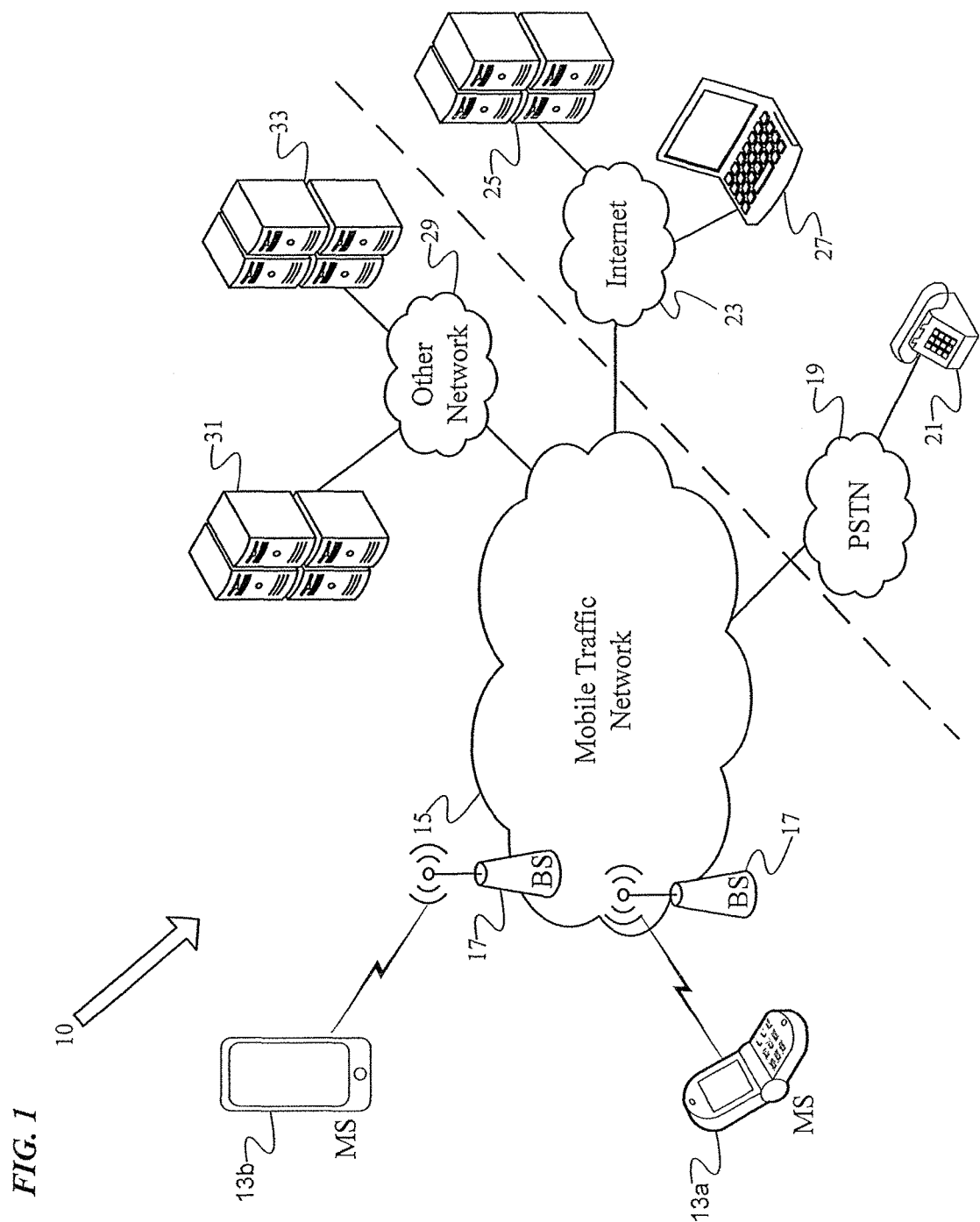

| | | | |
|---|---|---|---|
| 2012/0258689 A1* | 10/2012 | Yang | H04M 1/57 455/411 |
| 2013/0149997 A1* | 6/2013 | Zaidi et al. | 455/411 |
| 2013/0237204 A1* | 9/2013 | Buck | H04W 12/12 455/456.1 |
| 2013/0326642 A1* | 12/2013 | Hajj et al. | 726/34 |
| 2014/0143550 A1* | 5/2014 | Ganong, III | G06F 21/606 713/189 |
| 2014/0149746 A1* | 5/2014 | Yau | H04W 12/06 713/185 |
| 2014/0189885 A1* | 7/2014 | Golan | 726/28 |
| 2014/0273880 A1* | 9/2014 | Sima et al. | 455/68 |
| 2014/0373184 A1* | 12/2014 | Mahaffey | H04W 12/12 726/35 |
| 2015/0148007 A1* | 5/2015 | Mitchell et al. | 455/411 |

\* cited by examiner

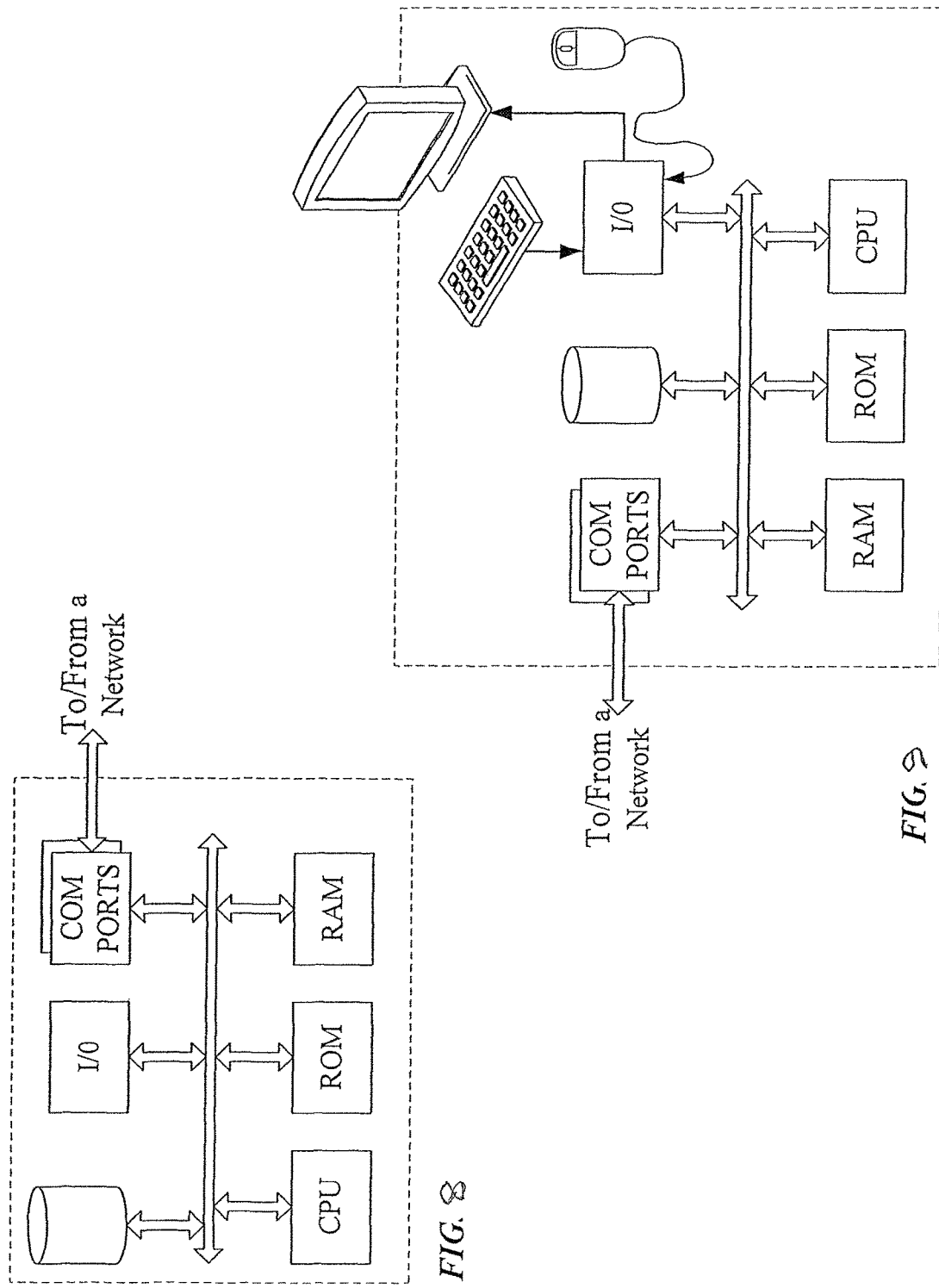

DEVALUATION OF LOST AND STOLEN DEVICES

BACKGROUND

In recent years, mobile communication services have expanded and increased in popularity around the world. Many advanced networks offer wireless mobile communication service for voice calls, mobile phone messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks from their mobile stations. Examples of mobile station content items include, without limitation, media, games, messaging, social networks, stores, and any other applications or information for use on a mobile phone or on a tablet computer.

Mobile developers today are increasingly creating applications on mobile devices or mobile stations. These applications are usually supplied through online distribution, rather than traditional methods of boxed software or direct sales from software vendors. These suppliers, known as "app stores," provide centralized catalogues of software from the operating system (OS) supplier or device manufacturer and developers with whom the store operator has contractual arrangements, and allow easy installation and updates. The app store is often shared with smartphones that use the same operating system. Some apps may be distributed for free, but users pay fees for many applications. Mobile content, such as music and/or video content may be distributed from on-line stores in a similar fashion. A smartphone, the downloaded apps and any downloaded content become valuable assets of the user/customer.

Millions of mobile devices are lost to fraud scams that target network theft and provide a black market for lost or stolen devices. With global demand for mobile devices, fraud scams and theft are on the rise. Mobile devices that are stolen or lost are still useful in wireless mobile communication and, thus, have an available market in this country and overseas. For example, stolen mobile devices can still be used via Wi-Fi and still have value on the black market.

It is desirable, therefore, to provide a strategy for mitigating theft and resale of mobile devices, by devaluing lost or stolen devices. For example, as will be described later, by providing a system and method for restricting use of a mobile device after it has been reported lost or stolen, the value of the mobile device would decrease.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 is a high-level functional block diagram of an example of a system of networks/devices that provide various communications for mobile devices, and supports an example of a system for devaluing a lost/stolen mobile device (or mobile station).

FIG. 2 is a high-level functional block diagram of an example of a non-touch type mobile device that may be utilized for devaluing a lost/stolen mobile device, when used in the system shown in FIG. 1.

FIG. 3 is a high-level functional block diagram of an example of a touch screen type mobile device that may be utilized for devaluing a lost/stolen mobile device, when used in the system shown in FIG. 1.

FIG. 4 is a simple high-level flow diagram showing a customer configuring a password for a mobile device, in which the password configuration is performed during set-up procedures.

FIG. 5 is a simple high-level flow diagram showing an example of a method for devaluing a lost/stolen mobile device.

FIGS. 6A and 6B are simple high-level flow diagrams showing examples of methods for devaluing a lost/stolen mobile device.

FIG. 7 is simple high-level flow diagram showing an example of allowing the lost/stolen mobile device to be used in the system of FIG. 1, after the customer finds the mobile device.

FIG. 8 is a simplified functional block diagram of a computer that may be configured as a host or server, for example, to function as a server in the system of FIG. 1.

FIG. 9 is a simplified functional block diagram of a personal computer or other work station, terminal device, or computer tablet that may function in the system of FIG. 1.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to devaluing a lost or stolen mobile device. For example, a customer may report a mobile device lost or stolen. The network provider may suspend a mobile identifier number that is associated with the mobile device in response to the report. The network provider may then transmit the suspended mobile identifier number to an Equipment Identity Registry (EIR) database. The EIR database may be used to restrict device identifiers from attaching to a carrier's network. Upon finding the device ID (for example, the device's Electronic Serial Numbers (ESN), Mobile equipment Identifier (MEID), or International Mobile Equipment Identifier (IMEI)) in the EIR database, the network provider may send a specific flag, such as a Cause Code 6 (CC6), which identifies that the device is lost/stolen and restricts the device from obtaining service over the network. With the CC6, or any other flag that may be used by a network to restrict access to its network, that device is prevented from receiving or sending Internet Protocol (IP) packets over the network. All network carriers are expected to contribute to the EIR database and restrict any lost/stolen device from their respective networks.

Another example of a devaluation method for a mobile device includes configuring the mobile device to invoke a lock screen and password entry requirement, after the mobile identifier has been added to a negative list (for example, the list in the EIR database) which may be used to list device identifiers that are restricted from accessing the carrier's network (or are prevented from attaching to the carrier's network). The password may be the same password as the password created by the owner of the device during initial set-up procedures for the device. As contemplated by the present example, a mandatory step in the Wizard set-up guide requires a password for a lock screen. The password may be stored on the owner's account (per mobile identifier number). The password may be accessible and manageable through self-serve channels (for example, MyVerizon). The password may be reset, if forgotten, through standard operational procedures that prove a customer's identity to a network provider's representative.

After issuing the network's CC6, or any other flag indicating that the mobile device is lost/stolen the mobile device may invoke a lock screen and password entry requirement. The password may be the same as the password created by the owner of the device during initial set-up procedures. The device may be configured to allow N-attempts (defined by the network carrier) to enter the correct password. Upon exhaustion of N-attempts (which may be one attempt or multiple attempts) by the user, the device may be configured to be reset to factory setting. The lock screen may then become persistent, even upon factory setting reboot, or upon replacement of a Universal Integrated Circuit Card Identifier (UICCID).

The device may be configured to invoke the persistent lock screen, until the CC6, or any other flag indicating a lost/stolen device is removed from the network (for example, by removing the ID identifier number from the EIR database). The network provider may have a master unlock key that may be invoked by a representative of the network provider. The master unlock key may be encrypted for safe transmission to the customer via email (or any other communication method).

As another example of a devaluation method, upon the network's CC6 (or any other flag of a lost/stolen device), the mobile device may invoke encryption of data stored internally and externally in memory drives (for example, SD cards).

As still another example of a devaluation method, upon the network's CC6t (or any other flag of a lost/stolen device), the mobile device may be configured to turn OFF the Wi-Fi Radio Network and restrict access to Wi-Fi service. Only after a user enters the correct password into the mobile device is the lock screen removed and the Wi-Fi radio access turned ON.

As yet another example, a customer who finds his or her mobile device, may need to declare that the device has been found through communications with a representative of the network provider. A customer who finds his or her mobile device may have to enter a password once and then be allowed into the device. The password unlock may only be invoked after the removal of the network CC6, or any other agreed-to flag from the database (for example, the EIR database).

Reference is now made in detail to the examples illustrated in the accompanying drawings and discussed below. FIG. 1 illustrates a system 10 offering a variety of mobile communication services, including devaluation methods for mobile device users, or mobile station users. The example shows simply two mobile stations (MSs) 13a and 13b as well as a mobile communication network 15. The stations 13a and 13b are examples of mobile stations that may be used for the devaluation methods. However, the communication network provides similar communications for many other similar users, as well as for mobile devices/users that do not participate in the devaluation methods. The network 15 provides mobile wireless communication services to those stations as well as to other mobile stations (not shown), for example, via a number of base stations (BSs) 17. The present techniques may be implemented in any of a variety of available mobile networks 15 and/or on any type of mobile station compatible with such a network 15. The drawing shows only a very simplified example of a few relevant elements of network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations are capable of communications through network 15, using the devaluation methods. The exemplary devices 13a and 13b are capable of data communications through the network 15 and the users thereof typically have subscribed to data service through the networks.

The network 15 allows users of the mobile stations, such as 13a and 13b (and other mobile stations not shown), to initiate and receive telephone calls to each other as well as through the public-switched telephone network (PSTN) 19 and telephone stations 21 connected to the PSTN. The network 15 typically offers a variety of data services via a global network (e.g., the Internet 23), such as app download, multimedia content downloads, web browsing, content streaming, email, etc. The mobile stations 13a and 13b may receive and execute applications written in various programming languages, as described later.

The mobile stations may take the form of portable handsets, smart-phones, personal digital assistants, or tablets although they may be implemented in other form factors. Program applications, including an application to assist in the devaluation methods may be configured to execute on many different types of mobile stations. For example, a mobile station application may be written to execute on a binary runtime environment for mobile (BREW-based) mobile station, a Windows Mobile based mobile station, Android, iOS iPhone or iPad, Java Mobile, Windows Mobile, BlackBerry, or the like. Many of these types of devices may employ a multi-tasking operating system.

The mobile communication network 15 may be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of network 15, such as that serving the mobile stations, may include one or more RANs and a regional circuit and/or packet switched network and associated signaling network facilities.

Physical elements of a RAN operated by one of the mobile service providers or carriers include a number of base stations represented in the example by the base stations (BSS) 17. Although not separately shown, such a base station 17 may include a base transceiver system (BTS), which may communicate via an antennae system at the site of the base station and over the airlink with one or more of the mobile stations, when the mobile stations are within range. Each base station may include a BTS coupled to several antennae mounted on a radio tower within a coverage area often referred to as a "cell." The BTS is the part of the radio network that sends and receives RF signals to/from the mobile stations that are served by the base station 17. Later generation mobile networks utilize wireless access elements, each referred to as an eNodeB, to provide functions similar to those of a base station; but for convenience, the discussion here will generally include eNodeBs and other network wireless access devices under the general term base station.

The radio access networks may also include a traffic network represented generally by the cloud at 15, which carries the user communications and data for the mobile stations between the base stations 17 and other elements with, or through which the mobile stations communicate. It will be understood that the various network elements may communicate with each other and other networks (e.g., a PSTN and the Internet) either directly or indirectly.

Although not shown, the provider or carrier may also operate a number of systems that provide ancillary functions in support of the communications services and/or application services provided through network 15, and those elements may communicate with other nodes or elements in system 10 via one or more private IP type packet data networks (sometimes referred to as an Intranet), i.e., a private network. Examples of such systems may include one or more application servers and related authentication servers.

A mobile station 13a or 13b may communicate over the air with base station 17 and through traffic network 15 for various communications. If the mobile service carrier offers the devaluation service, the service may be hosted on a server 31, for communication via network 15. Alternatively, programming for the devaluation service may be distributed across multiple components of system 10. For a given service, including the devaluation service, an application program within a mobile station may be considered as a 'client' and programming at server 31 may be considered as the 'server' application for the particular service. Two additional servers are shown, namely, server 33 communicating through network 29, and server 25 communicating through the Internet 23.

For example, a customer may report a mobile device lost or stolen. This may be done using telephone 21 through a public-switched telephone network (PSTN) 19 (for example). The report may be received by an administrator of server 31 or server 33 (for example), and a mobile identifier of the lost device (13a or 13b) may be stored in the server that is administered by the administrator of the network (for example, network 29). The network provider may suspend a mobile identifier number that is associated with the mobile device in response to the report. The network provider may then transmit the suspended mobile identifier number to an Equipment Identity Registry (EIR) database. The EIR database may be used to restrict the device associated with the device identifier from attaching to a carrier's network, or participating in the carrier's network. The EIR database may reside in server 31, 33, or any other server, such as server 25. Upon finding the device ID (for example, the device's ESN, MEID, or IMEI) in the EIR database, the network provider may send the CC6 or any other flag to the mobile device, which restricts that mobile device from receiving or sending Internet Protocol (IP) packets over the network.

After receiving the CC6 from the network provider, or any other flag which restricts access to a network, the mobile device (13a or 13b) may activate the lock screen and password entry, requirement. The password may be the same password as the password created by the owner of the device during initial set-up procedures for the device. The password may be stored only in a memory location of the mobile device, as is currently done for mobile devices. The password may be accessible and manageable through self-serve channels (for example, MyVerizon). The password may be reset, if forgotten, through standard operational procedures that prove a customer's identity to a network provider's representative. More details on procedures for unlocking a mobile device (13a or 13b), after being located by the owner of the device, are provided later with reference to FIG. 7.

Associated devaluation procedures or methods under consideration here may be delivered to touch screen type mobile stations, as well as to non-touch type mobile stations. Hence, mobile station (MS) 13a is shown as a non-touch type mobile station and mobile station (MS) 13b is shown as a touch screen type mobile station. Implementation of the devaluation service may involve some execution of programming in the mobile stations, as well as implementation of user input/output functions and data communications through network 15 from the mobile stations.

It may be useful to consider the functional elements/aspects of two exemplary mobile stations 13a and 13b, at a high-level.

Figure 2:
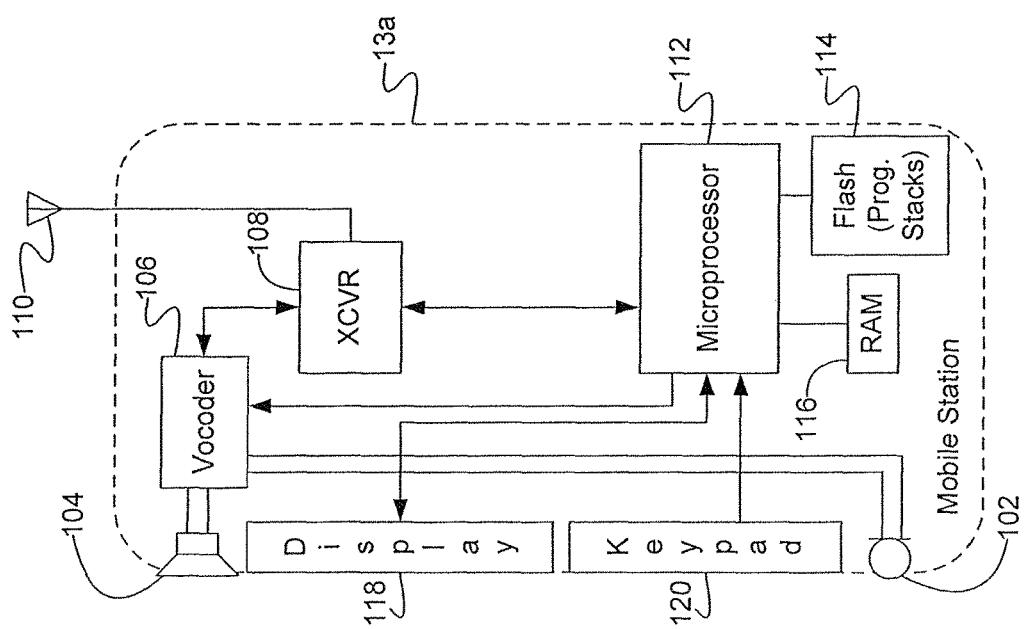

For purposes of such a discussion, FIG. 2 is a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of network 15. The transceiver 108 also sends and receives a variety of signaling messages in support of the various audio and data services provided via the mobile station 13a and the communication network. Each transceiver 108 connects through radio frequency (RF) transmit and receive amplifiers (not separately shown) to an antenna 110. The transceiver 108 may also support various types of mobile messaging services, such as short message service (SMS), enhanced messaging service (EMS) and/or multimedia messaging service (MMS).

The example mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 112 serves as a programmable controller for the mobile station 13a, in that it controls all operations of the mobile station 13a in accord with programming that it executes, for all normal operations, and for operations involved in the devaluation procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by microprocessor 112.

As outlined above, the mobile station 13a includes a processor, and programming stored in the flash memory 114 configures the processor so that the mobile station is capable of performing various desired functions, including the functions involved in the devaluation techniques or methods.

Figure 3:
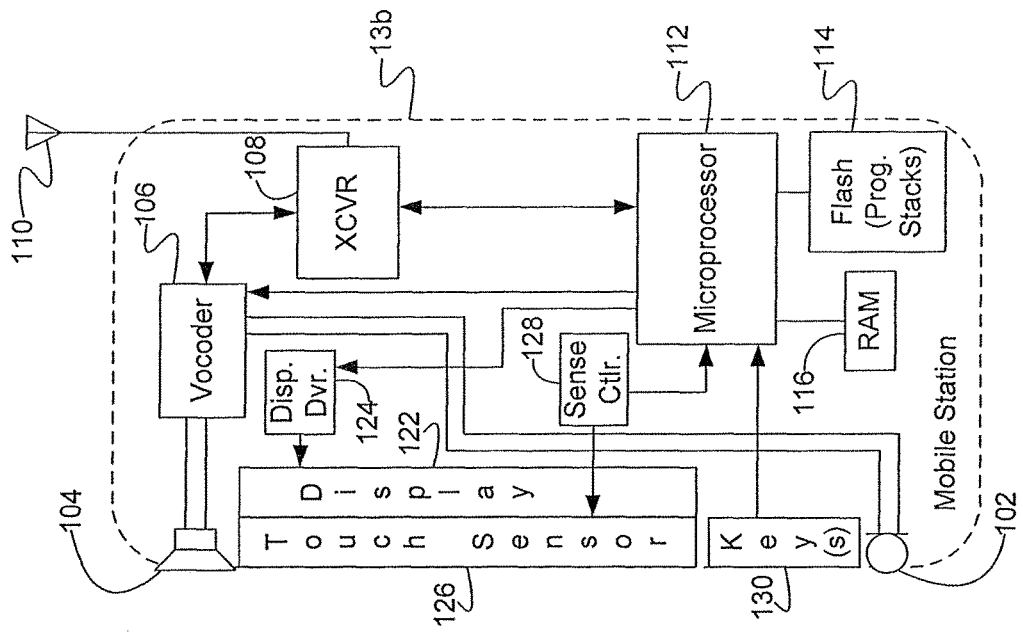

FIG. 3 is a block diagram illustration of an exemplary touch screen type mobile station 13b. Although possibly configured somewhat differently, at least logically, a number of the elements of the exemplary touch screen type mobile station 13b are similar to the elements of mobile station 13a, and are identified by like reference numbers in FIG. 3. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of network 15. The transceiver 108 also sends and receives a variety of signaling messages in support of the various audio and data services provided via mobile station 13b and the communication network. Each transceiver 108 connects through RF transmit and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the devaluation procedures under consideration here. In the example, mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, as outlined above, the mobile station 13b includes a processor; and programming stored in the flash memory 114 configures the processor so that the mobile station is capable of performing various desired functions, including in this case the functions involved in the devaluation techniques.

In the example of FIG. 2, the user interface elements include a display and a keypad. The mobile station 13b, in the example of FIG. 3, may have a limited number of keys 130, but the user interface functions of the display and keypad are replaced by a touchscreen display arrangement. At a high level, a touchscreen display is a device that displays information to a user and detects occurrence and location of a touch on the area of the display. The touch may be an actual touch of the display device with a finger, stylus or other object, although at least some touchscreens may also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver (disp. dvr.) 124, to present visible outputs to the device user. The mobile station 13b also includes a touch/position sensor 126. The sensor 126 is relatively transparent, so that the user may view the information presented on the display 122. A sense circuit (sense ctlr.) 128 senses signals from elements of the touch/position sensor 126 and detects occurrence and position of each touch of the screen formed by display 122 and sensor 126. The sense circuit 128 provides touch position information to microprocessor 112, which may correlate that information to information currently displayed via display 122, to determine the nature of a user input via the screen.

The display 122 and touch sensor 126 (and possibly one or more keys 130, if included) are the physical elements providing the textual and graphical user interface for mobile station 13b. The microphone 102 and speaker 104 may be used as additional user interface elements, for audio input and output, including with respect to some devaluation functions for the user delivered via the mobile station.

It will be understood that the structure and operation of the mobile stations 13a and 13b, as outlined above, are describe by way of example only.

Figure 4:
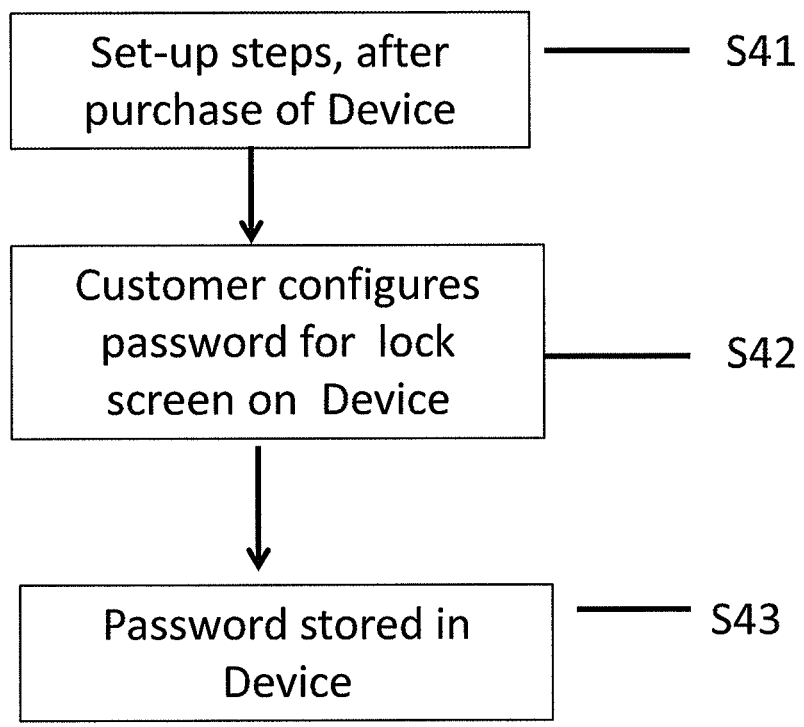

Referring now to FIG. 4, there is shown a high-level flow diagram of a customer configuring a password for a mobile device. As shown, after purchasing the mobile device, the customer configures set-up procedures required for the device (S41). During these set-up procedures, a password for a lock screen on the mobile device is also set-up (S42). This password is stored in the mobile device (S43). The example contemplates that a password is required for unlocking the screen on the mobile device. Conventionally, a password is not required for a mobile device, but is optional. For later devaluation purposes, the device set-up procedure may entail password selection for a lock screen, even though the lock screen may optionally be deactivated during normal operations. In such a set-up, the lock-screen and password requirement could be activated as part of the devaluation process in the event the device is lost or stolen. The activation of the password in the mobile device could be done through a flag provided by the network carrier, such as a CC6, or any other flag depending on the protocol in use by the network carrier. The password selected by the owner during set-up procedure may be stored in the device only, as is currently done. However, once the device is reported lost or stolen, the network provider may cause the device to activate the lock-screen and password in order to activate the device. This password may also be stored in the lost or stolen device.

Figure 5:
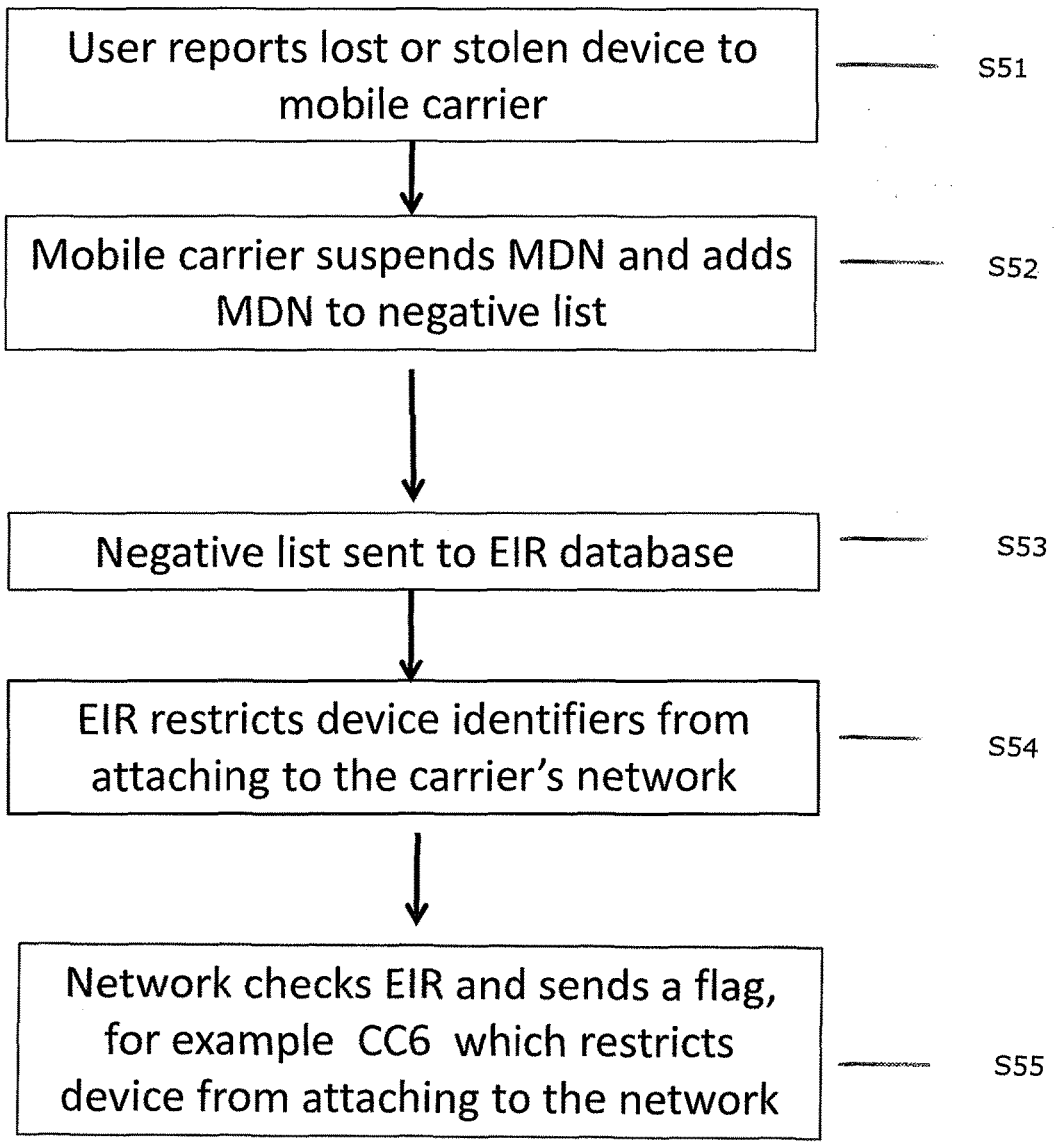

Referring next to FIG. 5, there is shown a high-level flow diagram of an example of a method for devaluing a lost/stolen mobile device. As shown, using step S51, the user reports a lost/stolen device to his or her mobile carrier. For example, this may be done using telephone 21 through a public-switched telephone network (PSTN) 19. The report may be received by an administrator of server 31 or server 33 (for example), and a mobile identifier of the lost device (13a or 13b) may be stored in the server that is administered by the administrator of the network (for example, network 22). The report may also be sent to the carrier by web-site through Internet 23, or network 15 (for example). Upon receiving the report, the mobile carrier may suspend the mobile identifier number (for example, an MDN) of the mobile device and may add the mobile identifier number to a negative list of stolen/lost devices (S52). The suspended mobile identifier number may also be sent to a centralized equipment identity registry (EIR) database (S53). It is contemplated by the example, that other network providers may participate in the EIR database and they also may report stolen/lost mobile devices to the same EIR database. The EIR database may then be used by network providers to restrict the mobile device from attaching to the communication network (S54). For example, a device must request the network providers to allow it to communicate through the network (or attach to the network). If attachment is refused by the network provider, the device cannot communicate through the network. Upon checking and finding the device identifier in the EIR database, the network provider of the respective mobile device may prevent the mobile device from attaching to the network. A flag, such as CC6, may be used to prevent the mobile device from attaching to the network. It will be understood that every network carrier has a mechanism to prevent one of its mobile devices from attaching to its network. Such mechanism includes the issuance of a flag, such as the CC6, which prevents the mobile device from attaching to the network. In such circumstance, the mobile device cannot transmit, nor receive, messages through the network. The example of FIG. 5 devalues a lost or stolen mobile device by preventing further usage of the device through the network. As another example of a devaluation method, reference is now made to FIGS. 6A and 6B.

Figure 6A:
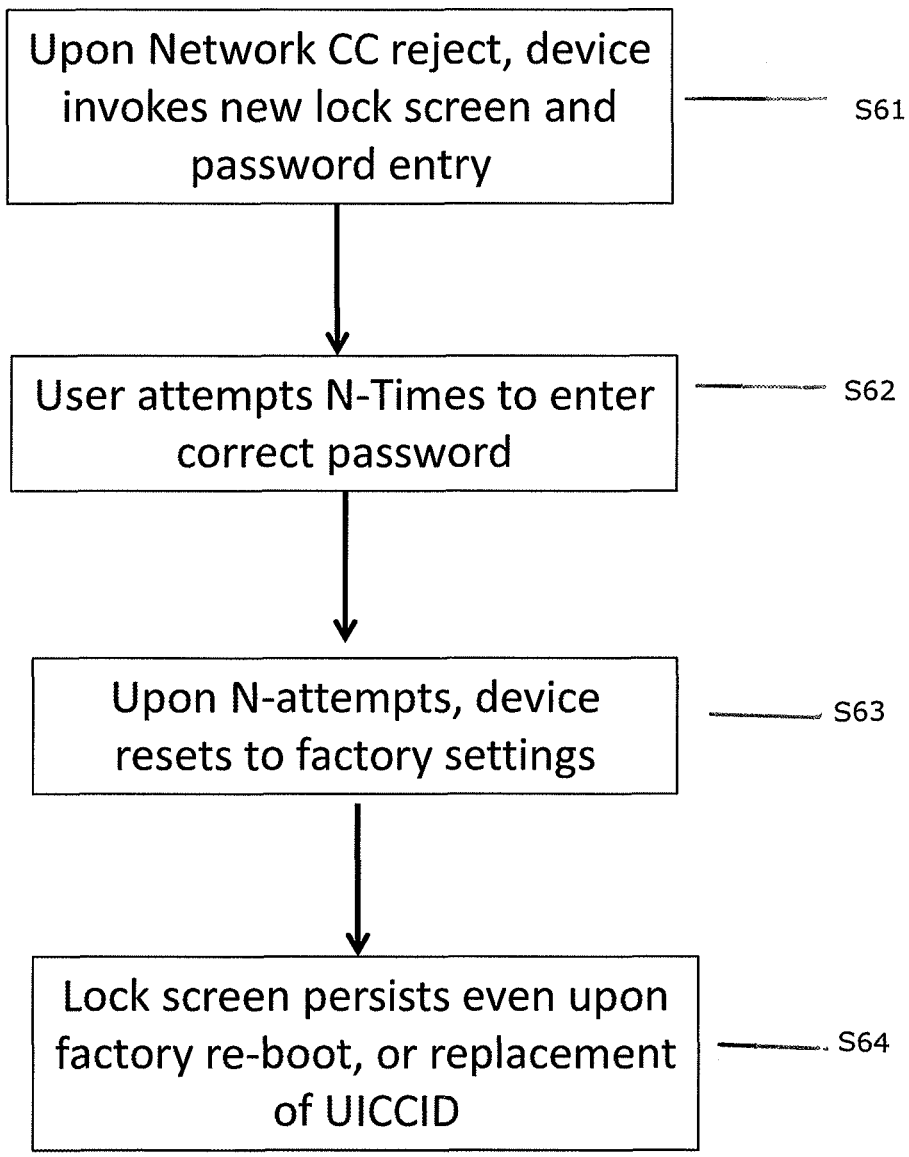

As shown in FIG. 6A, upon issuance of the flag, a lock screen is displayed on the display of the mobile device. The user of the lost/stolen mobile device must now enter the password into the mobile device (S62) to gain access to device features/functions. The user may be allowed N attempts to correctly enter the password, so that he or she is allowed to enter the mobile device (S63). The number of attempts may be set by the mobile device or activated by the mobile carrier. In addition, after N attempts (which may, at the option of the network provider, be one attempt or more than one attempt), the lock screen on the mobile device is configured to be persistent (S64). When persistent, the lock screen continues to be displayed on the mobile device, even upon factory re-booting of the device or upon replacement of a subscriber identity module (SIM) which has its own unique UICCID. The EIR includes a listing of the ID of the device, which does not change when the SIM of the device is changed.

Figure 6B:
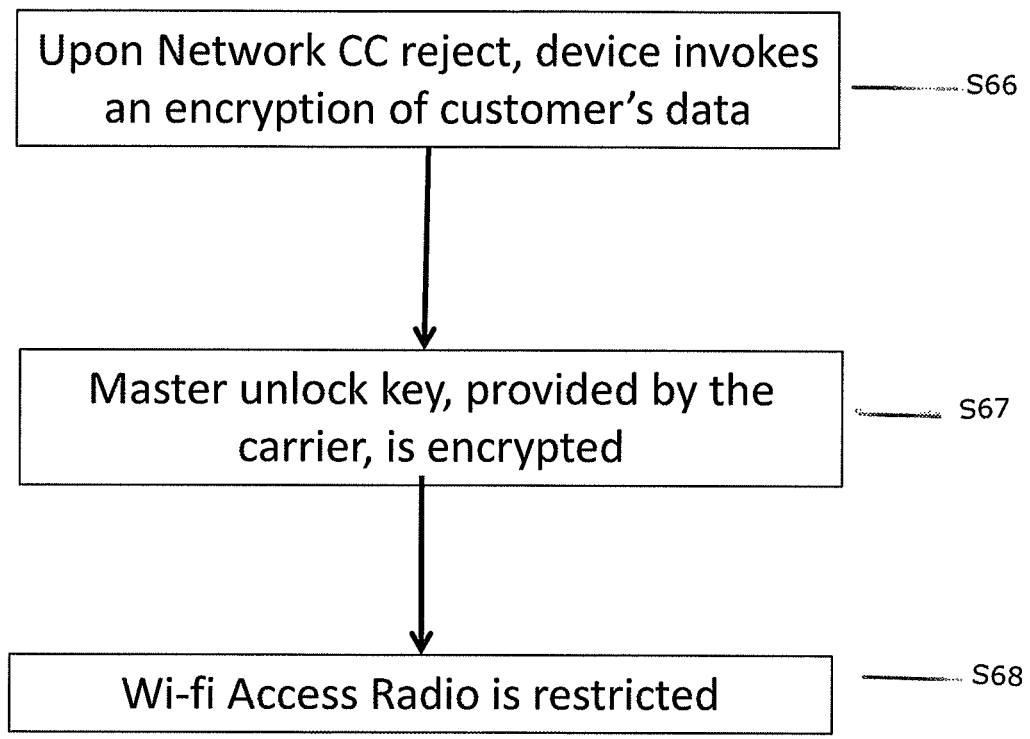

As another example of devaluing a mobile device, reference is now made to FIG. 6B. As shown, upon network CC rejection (or any other flag that may be used to identify that the mobile device is stolen/lost), all customer data in the mobile device is encrypted so that the user of the mobile device cannot destroy the data (S66). It is contemplated that the data which is encrypted is personal data, such as telephone contact lists, email lists, etc. Application programs required for operating the mobile device are not encrypted, so that the mobile device may still communicate with the network provider. The network provider of the lost/stolen device now sets up a master unlock key which is also encrypted (S67). This master unlock key is used to enable further use of the device; and without the key, a thief or a person finding the lost device cannot gain access to the device.

The master unlock key, however, can be sent to the user, after he correctly identifies himself as the proper owner of the mobile device, for use in the event of recovery of the device. The verification of the user's identity may be performed by a representative of the network provider. The verification may be done by way of a telephone call, for example. Since the application programs are not encrypted, it is contemplated that the network provider may sent the master unlock key through the network to the mobile device. An application program in the mobile device may be configured to receive the master unlock key and decrypt the user's personal data.

Since it is contemplated that the application programs and the operating system of the mobile device need not be encrypted, a software module that may be inserted within either, an application program or the operating system, may be configured to receive the master unlock key, without any intervention by the user. (Recall that the screen of the mobile device is locked and the user cannot enter any data into the device.) Upon receiving the master unlock key, the software module progresses to decrypt the personal data previously stored in the device. After the user (owner) unlocks the screen by providing a correct password, the device unlocks the screen and the user may now access the personal data stored in the device.

As an additional step in devaluing the lost/stolen device, the method in the example prevents or restricts Wi-Fi access by the lost/stolen mobile device (S68). This may be done by sending a command or a flag from the network provider to the lost or stolen device to turn OFF the Wi-Fi access. This command or may be the same described earlier which is sent from the network provider.

Figure 7:
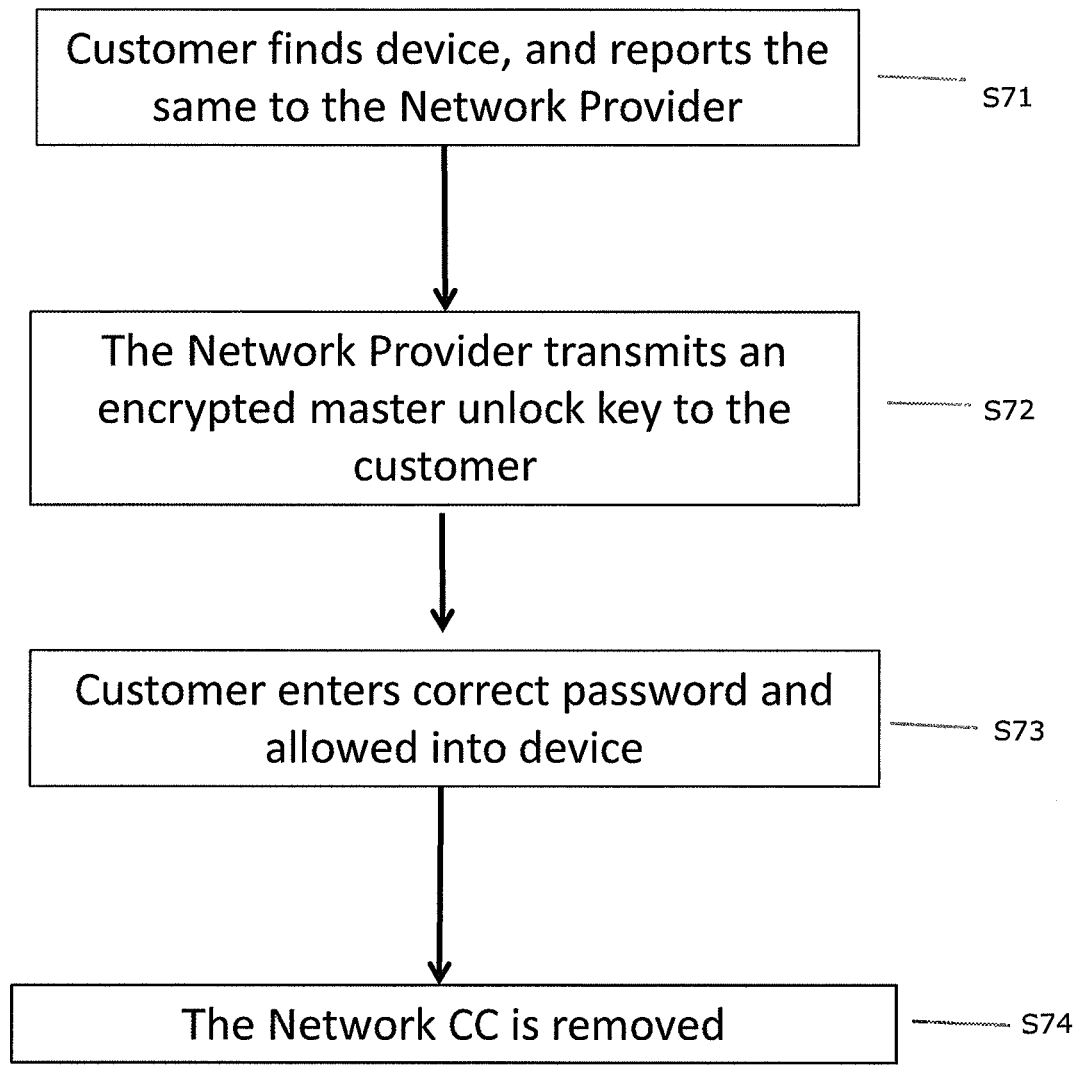

FIG. 7 depicts an example of a process flow, for a technique for allowing the lost/stolen mobile device to be used again in the system of FIG. 1, for example, after the customer finds the lost or stolen mobile device. Assuming that the customer finds the mobile device (S71), the customer now reports the finding to the network provider. Assuming that a representative from the network provider is convinced that the customer did, indeed, find the mobile device, the encrypted master unlock key (set-up by step S67) is transmitted to the customer (S72). After entering a correct password, in response to the master unlock key, the customer is allowed entry into the mobile device (S73). Finally, the flag of the stolen/lost device (for example, a negative Cause Code 6) is removed from the EIR database (S74). The mobile device is now usable again.

As shown by the above discussion, functions relating to the devaluation service may be implemented on computers connected for data communication via the components of a packet data network, operating as the various servers and/or client mobile stations, as shown in FIG. 1. Although special purpose devices may be used, devices implementing server or network database functions or the like also may be implemented using one or more hardware platforms intended to represent a general class of data processing device commonly used to run "server" programming so as to implement the devaluation functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the devaluation service. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for devaluation, in essentially the manner performed in the implementations described and illustrated herein.

FIGS. 8 and 9 provide functional block diagram illustrations of general purpose computer hardware platforms. FIG. 8 illustrates a network, or host computer platform, as may typically be used to implement a server, including network control 31 (FIG. 1). FIG. 9 depicts a computer with user interface elements, as may be used to implement a personal computer or other type of work station or terminal device, although the computer of FIG. 9 may also act as a server, if appropriately programmed. It is believed that the general structure and general operation of such equipment, as shown in FIGS. 8 and 9, are self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the devaluation methods outlined above may be embodied in programming. Some program aspects of the device devaluation technology may relate to programming for the appropriate network connected server platform(s). Some program aspects of the technology may relate to programming for a mobile device, e.g. to configure the device to receive and respond to a cause code or other alter to activate a password requirement and associated lock-screen, for the device devaluation.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for devaluing a lost or stolen mobile device, the method comprising:
  receiving, by the mobile device, an encrypted master unlock key from a server; and
  decrypting, by the mobile device, customer data prior to allowing an owner to unlock the mobile device, wherein the encrypted master unlock key is generated by the server that:
    receives a report that a mobile device is lost or stolen,
    suspends a mobile identifier number associated with the mobile device, in response to the report, and prevents the mobile device from accessing a communication network,
    transmits, via the communication network, the suspended mobile identifier number to a storage device for access by other servers from other communication networks,
    sends a flag to the mobile device, wherein the flag prevents the mobile device from accessing the communication network,
    generates the encrypted master unlock key for the mobile device, and
    receives a verification via the communication network that a user of the mobile device is also an owner of the mobile device.

2. The method of claim 1 wherein the server stores the suspended mobile identifier number in an equipment identity registry (EIR) database at a second location which is different from a location associated with the server.

3. The method of claim 2 wherein another server checks the EIR database for the suspended mobile identifier number, and if found in the EIR database, suspends the mobile device from accessing the other communication networks.

4. The method of claim 1, further comprising:
  executing a lock screen and password entry procedure, after receiving the flag sent from the server.

5. The method of claim 4, further comprising at least one of:
  recognizing a password entered by the user, in which the password is the same as a stored password entered during initial set-up of the mobile device, or resetting a configuration of the mobile device to a factory setting, after exhaustion of a predetermined number of attempts to enter a correct password.

6. The method of claim 4, further comprising:
  activating a new lock screen upon exhaustion of a predetermined number of attempts to enter a correct password.

7. The method of claim 1, further comprising:
  encrypting all customer data stored within the mobile device upon receiving the flag from the server, and wherein the customer data is decrypted upon receiving the encrypted master unlock key.

8. The method of claim 7, further comprising:
allowing the user to access the decrypted customer data stored within the mobile device upon entering a correct password.

9. The method of claim 1, further comprising:
turning OFF Wi-Fi access automatically in response to receiving the flag from the server without permitting Wi-Fi access to be manually reactivated prior to the correct password being entered at the mobile device.

10. The method of claim 9, further comprising:
turning ON the Wi-Fi access automatically in response to entering a correct password, by the user, in the mobile device.

11. A system for devaluing a mobile device, the system comprising:
a mobile device, comprising:
a first interface which communicates over a communication network;
a first memory which stores instructions;
a first processor, coupled to the first interface and the first memory, wherein the first processor is configured to execute the instructions stored in the first memory that cause the first processor to:
receive an encrypted master unlock key, and
decrypt customer data prior to allowing an owner to unlock the mobile device; and
a server, the server comprising:
a second interface which communicates over the communication network;
a second memory which stores instructions;
a second processor, coupled to the second interface and the second memory, wherein the second processor is configured to execute the instructions stored in the second memory which cause the second processor to:
receive a report that the mobile device is lost or stolen,
suspend a mobile identifier number associated with the mobile device in response to the received report, wherein the mobile device is restricted from communicating via the communication network,
transmit, via the communication network, the suspended mobile identifier number to a storage device for access by other servers from other communication networks;
send a flag to the mobile device, wherein the flag prevents the mobile device from accessing the communication network,
generate an encrypted master unlock key for the mobile device,
receive a verification via the communication network that a user is the owner of the mobile device after the owner finds the mobile device, and
provide, via the communication network, the encrypted master unlock key to the mobile device in response to receiving the verification.

12. The system of claim 11 wherein the instructions stored in the first memory cause the first processor to:
activate a lock screen and password entry, and
reset to a factory setting after allowing a predetermined number of attempts to enter a correct password to unlock the lock screen.

13. The system of claim 12 wherein the instructions stored in the first memory cause the first processor to:
turn OFF access to a Wi-Fi Radio in the mobile device.

14. The system of claim 12 wherein upon resetting the mobile device to the factory setting, the instructions stored in the first memory cause the first processor to:
send an encrypted password to a user of the mobile device, in response to an authentication request by the user to a network provider.

15. A system for devaluing a mobile device, the system comprising:
a first processor in a mobile device for executing password verification steps between the mobile device and a network provider,
a communication network for reporting a mobile device as being lost or stolen between a customer and the network provider,
the network provider including a second processor for suspending a mobile identifier number associated with the mobile device, and
a database for storing a suspended mobile identifier number associated with the mobile device,
wherein the second processor generates an encrypted master unlock key for the mobile device, receives a verification via the communications network that a user is an owner of the mobile device after the owner finds the mobile device, and provides, via the communication network, the encrypted master unlock key to the mobile device in response to receiving the verification,
wherein the first processor in the mobile device executes the password verification steps and activates a lock screen and a password verification, in response to at least one failed attempt by a user to enter correct verification steps between the mobile device and the network provider, and
further wherein the first processor receives the encrypted master unlock key, and upon receiving the encrypted master unlock key, decrypts customer data prior to allowing the owner to unlock the mobile device, and
further wherein the first processor restricts Wi-Fi access, in response to the at least one failed attempt.

16. The system of claim 15 wherein
the database includes a listing of lost or stolen mobile devices from the network provider and other network providers connected to the communication network.

17. The method of claim 6, further comprising:
persistently displaying the new lock screen that is maintained upon a factory setting reboot or upon replacement of a universal integrated circuit card identifier (UICCID).

18. The method of claim 7, further comprising:
encrypting customer data stored in an external memory, wherein the external memory includes a secure digital (SD) card.

19. The method of claim 7, further comprising:
encrypting customer data which includes at least one of telephone contact lists or email lists, and further wherein the mobile devices avoids encrypting at least one of application programs or programs associated with operation of the mobile device.

20. The method of claim 7, further comprising:
decrypting, without manual intervention of the user, the customer data upon receiving the encrypted master unlock key.

* * * * *